Patented June 17, 1930

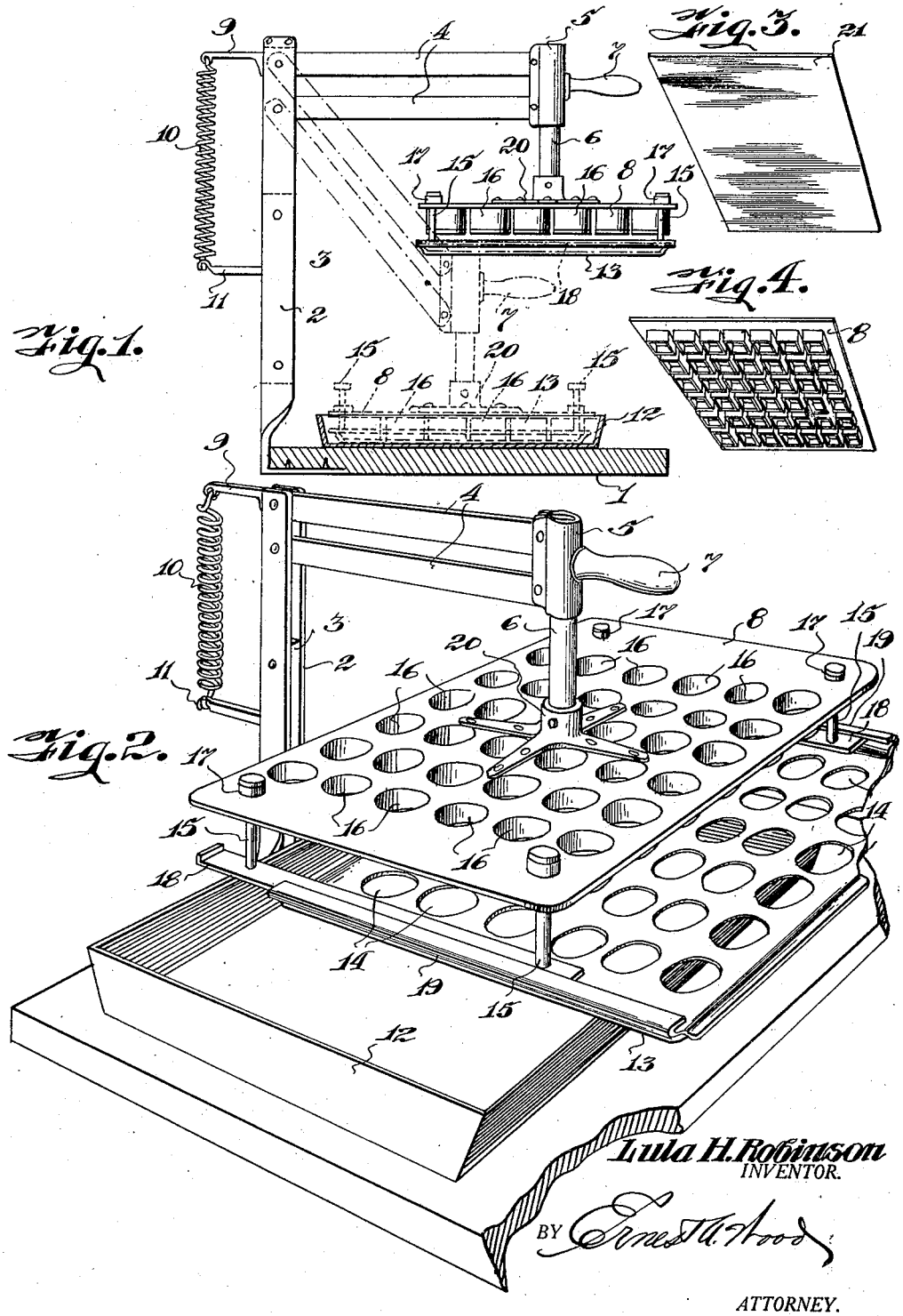

1,765,285

UNITED STATES PATENT OFFICE

LULA H. ROBINSON, OF DALLAS, TEXAS

MACHINE FOR CUTTING DOUGHY SUBSTANCES

Application filed June 9, 1928. Serial No. 284,024.

This invention relates to a machine for cutting biscuits, cookies and other edible products made from doughy substances, and the invention has particular reference to a machine wherein the dough may be pressed to the desired thickness and cut in one operation in the utensil in which the commodity is cooked, the principal object being to minimize the required amount of effort in producing biscuits, cookies and the like in quantity.

Another object of the invention resides in the provision of a machine as specified having provisions to enable it to cut material into any form or shape for cooking.

Still further, the invention comprehends among its objects, the provision of means in the form of readily detachable elements by which the machine may be kept clean and sanitary at all times.

With the foregoing objects as paramount, the invention has particular reference to its salient features of construction and arrangement of parts by which the foregoing objects are attained and which will become manifest as the description proceeds, taken in connection with the accompanying drawings wherein:—

Figure 1 represents a side elevational view of a machine constructed according to the present invention, shown partly in section.

Figure 2 is a perspective view of the machine, with portions broken away.

Figure 3 is a detail view of a press board used in connection with the invention, and Figure 4 is a detail view of a modified form of cutting element for cutting a commodity of different shape than by the use of the cutting element shown in Figure 2.

Continuing now more in detail with the drawings, 1 designates a base portion, preferably of soft wood, to which is bolted or otherwise secured, uprights 2. These uprights are preferably composed of strap metal, with a view of economy, and so bent in the manner shown as to extend upwardly in parallel relationship, and spaced apart by interposing member 3.

At the top of the uprights are pivotally secured arms 4, likewise relatively parallel and are adapted to carry a collar 5, which has rigidly fixed therein a rod 6. It will be noted that the collar 5, when moved by the handle 7 maintains strictly a vertical position with respect to the base 1, due to the parallel position of the arms 4, as shown in dotted lines in Figure 1.

In order that the cutter head 8 will remain normally in the position shown in solid lines in Figure 1, an arm 9, integral with the upper parallel arm 4 projects rearwardly of the machine in the manner shown in Figure 1 and has attached thereto a spring 10 having its opposite end connected to another similar arm 11 therebelow. The tension of the spring consequently is such as to cause the cutter head 8 to return to normal inoperative position when depressed to cutting position by the handle 7.

Ordinarily, the machine is adapted for cutting biscuits and the like directly in the pan or other utensil 12 in which they are to be cooked, and in this connection the pan 12 is shown in position to receive the cutter in Figures 1 and 2, and in dotted lines in this Figure is shown the cutter in cutting position.

The cutter head 8 and associated elements are composed of the head and a tray 13 having a multiplicity of perforations 14, and arranged to be suspended by pins 15 to the head 8 in such manner that it may be moved vertically with respect thereto, and in so moving, the cutter units 16 will be urged through the opening 14 with which it registers.

The pins 15 are slidable freely through bosses 17 affixed upon each corner of the head 8 and have their lower ends rigidly affixed to strips 18. These strips support the dough tray 13 which has its ends 19 so formed as to slidably receive the strips as shown expressly in Figure 2.

As previously mentioned, the head 8 is capable of detachment from the machine for cleaning, and being held upon the rod 6 by means of a spider 20, a pin 21 is removably inserted to non-rotatably connect the spider to the rod, and which may be readily withdrawn to remove the head for cleaning and other purposes, such as replacing the same with a cutter having cutting units of a different size and shape.

Having described in detail the various parts of the machine and their purpose in the assembly, the operation of the machine is as follows:

After the dough is worked to the desired consistency, the perforated tray 13 is removed from its position shown in Figures 1 and 2, and placed conveniently on the work table and the dough placed therein and pressed by use of the board 21 shown in Figure 3, to the desired thickness, after which, the tray is mounted upon the racks 18, in the position shown in Figure 1. The handle 7 is then pressed down to the position shown in dotted lines in Figure 1, the tray 13 resting upon the bottom of the pan 12, further pressure upon the handle will urge the cutters 16 through the dough reposing on the tray, and that portion of the dough over the openings 14 will be pressed through such openings into the pan and upon releasing the handle 7, the cutter head 8 will rise, carrying with it, the tray 13 on which only the dough trimmings remain, about the openings 14. These trimmings may be removed and worked into another mass and the operation repeated.

It will be understood that the pan 12 and even the tray 13 may be dispensed with if desired and the dough placed directly upon the base 1. The press board 21 then may be placed upon the mass of dough and the head 8 brought down upon it to press out the mass to the desired thickness, whereupon the board may be removed and the head brought down directly upon the dough to cut the same into biscuits, removing the trimmings afterwards and placing the biscuits into a proper utensil for baking.

Manifestly, the construction shown is capable of considerable modification and such modification as is considered within the scope of the appended claims is also considered within the spirit of the invention.

What is claimed is:—

1. In a cutting machine of the type set forth, a base, an upright secured to the base, a cutter, a pair of independent parallel arms pivoted to said upright and to said cutter to support the latter for vertical movements, a perforated dough tray, means movably engaged with the cutter to suspend the tray spaced below the cutter and to enable the cutter to move toward the tray when the latter reaches its lowest position, one of said arms having an extension which projects rearwardly of the pivotal connection of said last named arm to the upright, and a coil spring connected to said extension to normally hold each of said arms and thereby the cutter in raised position.

2. In a machine of the type set forth, a frame, a head having a plurality of cutting units, means to connect the cutter head to the frame for vertical movement, a dough receiving tray and having perforations to receive said cutting units therein, spaced strips below the cutter head, said tray having guides slidably engaged with the strips, and pins rigidly secured to the strips and slidably extending through the cutter head and having heads which engage the cutter head to limit downward movement of the tray relative to the cutter head.

3. In a machine of the type set forth, a frame, a head having a plurality of cutting units, means to connect the cutter head to the frame for vertical movement, a dough receiving tray having perforations to receive said cutting units therein, means connected to the head to suspend the tray spaced below the cutter head and to allow the head to move toward the tray when the latter reaches down position, and means to slidably connect the tray to said suspending means to enable removal of the tray from the cutter head.

In testimony whereof I affix my signature.

LULA H. ROBINSON.